Nov. 10, 1931.    R. WEIS    1,831,430
BEARING
Filed Oct. 24, 1928
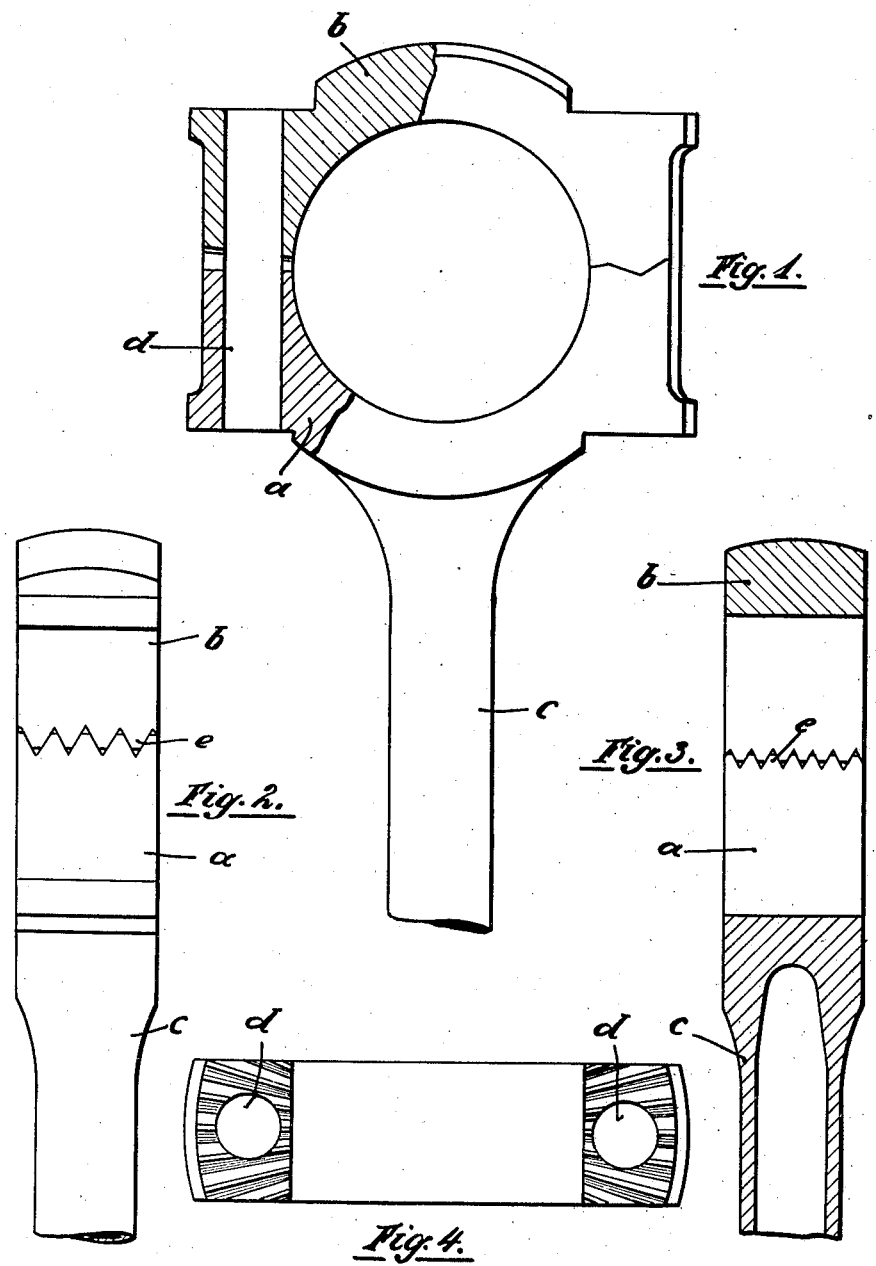

Patented Nov. 10, 1931

1,831,430

UNITED STATES PATENT OFFICE

RICHARD WEIS, OF STUTTGART-ZUFFENHAUSEN, GERMANY

BEARING

Application filed October 24, 1928, Serial No. 314,714, and in Germany November 3, 1927.

My invention relates to bearings and more especially to means whereby the two parts of the bearing, such as the body and the cap, or two brasses or the two halves of a bearing ring are secured against relative displacement and distortion or, in case of revolving bearings, against the formation of a gap at the joint which would impair the smooth revolution of the movable part and in the course of time would further separate the bearing parts. The invention is particularly important in its application to moving bearings, such as the bearings at the ends of connecting rods. In order to secure a close fit of the cap on the bearing body or of one half of a ring bearing on the other I form serrations on the contacting surfaces, the teeth and gaps being preferably shaped in accordance with generatrices intersecting in one point of the bearing axes.

In the drawings affixed to this specification and forming part thereof the end of a connecting rod embodying my invention is illustrated diagrammatically by way of example.

In the drawings

Fig. 1 is a side elevation, partly in section,

Fig. 2 is a front view,

Fig. 3 an axial section, and

Fig. 4 is a plan view, with the bearing cap removed.

Referring to the drawings, $a$ is the bearing body and $b$ is the cap. Both are provided with bores $d$, adapted for bolts (not shown) by means of which they can be connected. The mating faces of the parts $a$ and $b$ are not plane, as usual, and normal to the axis of the rod, but are formed with teeth $e$, the side walls of which taper in two directions, their flanks forming surfaces, the generatrices of which intersect in one point of the bearing axis. It will be apparent therefrom that the tooth outline on the inner bearing surface is smaller than that on the outer surface of the bearing (see Figs. 2 and 3).

This peculiar form of the serrations renders an automatic centering of the bearing parts possible and prevents both axial displacement and distortion of the parts. By tightening the connecting screws the joints between the mating faces of the teeth may practically be made to disappear, provided the serrations are accurately formed.

In view of the fact that the joint thus formed is entirely closed, the journals or the like revolving in the bearing will move continuously over a smooth bearing surface.

I prefer chamfering or removing the edges of the teeth as shown in Figs. 2 and 3.

I wish it to be understood that I do not desire to be limited to the exact details of construction shown and described for obvious modifications will occur to a person skilled in the art.

In the claim affixed to this specification no selection of any particular modification of the invention is intended to the exclusion of other modifications thereof and the right to subsequently make claim to any modification not covered by this claim is expressly reserved.

I claim:—

A bearing comprising two axially divided parts, serrations being formed on the contacting surfaces of said parts, said serrations extending on generatrices intersecting in a point of the axis of the bearing.

In testimony whereof I affix my signature.

RICHARD WEIS.